US 8,879,452 B2
Nov. 4, 2014

(12) United States Patent
Liu et al.

(10) Patent No.: US 8,879,452 B2
(45) Date of Patent: Nov. 4, 2014

(54) WIRELESS BEACON RECEPTION

(75) Inventors: Chun-Feng Liu, Sunnyvale, CA (US); Guido Robert Frederiks, Aptos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 13/427,821

(22) Filed: Mar. 22, 2012

(65) Prior Publication Data

US 2013/0077546 A1    Mar. 28, 2013

Related U.S. Application Data

(60) Provisional application No. 61/538,536, filed on Sep. 23, 2011.

(51) Int. Cl.
```
G08C 17/00      (2006.01)
H04W 52/02      (2009.01)
H04W 76/04      (2009.01)
```
(52) U.S. Cl.
CPC ...... *H04W 52/0216* (2013.01); *H04W 52/0274* (2013.01); *H04W 52/0229* (2013.01); *Y02B 60/50* (2013.01); *H04W 76/048* (2013.01)
USPC .......................................... 370/311; 370/328

(58) Field of Classification Search
USPC ......... 370/310–311, 328–339, 401–476, 342; 455/434–450
See application file for complete search history.

(56) References Cited

U.S. PATENT DOCUMENTS

| | | | |
|---|---|---|---|
| 7,881,755 B1 | 2/2011 | Mishra et al. | |
| 7,920,535 B2 * | 4/2011 | Zaks | .............................. 370/338 |
| 2007/0254619 A1 | 11/2007 | Salomone et al. | |
| 2009/0003252 A1 | 1/2009 | Salomone et al. | |
| 2009/0010191 A1 | 1/2009 | Wentink | |
| 2010/0110962 A1 | 5/2010 | Igarashi et al. | |
| 2010/0315983 A1 | 12/2010 | Choi et al. | |
| 2012/0182915 A1 * | 7/2012 | Wentink | ......................... 370/311 |
| 2013/0235773 A1 * | 9/2013 | Wang et al. | .................... 370/311 |

FOREIGN PATENT DOCUMENTS

WO    2011010181 A1    1/2011

OTHER PUBLICATIONS

International Search Report and Written Opinion—PCT/US2012/056746—ISA/EPO—Dec. 14, 2012.

(Continued)

*Primary Examiner* — Gary Mui
*Assistant Examiner* — Iqbal Zaidi
(74) *Attorney, Agent, or Firm* — Holland & Hart LLP

(57) ABSTRACT

This disclosure describes techniques operating a client device to communicate with a wireless access point. The client device may awake from a low power mode of operation receive a first portion of a beacon from the access point that includes a delivery traffic identification (DTIM) message. According to the techniques described herein, the client device may determine, based on the DTIM message, whether or not one or more packets of data are forthcoming from the access point. If one or more packets of data are forthcoming from the access point, the client device may remain in an active mode of operation to receive the forthcoming packets (and/or a second portion of the beacon). However, if no packets of data are forthcoming from the access point, the client device may return to the low power mode of operation, before receiving and/or processing the second portion of the beacon.

55 Claims, 5 Drawing Sheets

(56) References Cited

OTHER PUBLICATIONS

IEEE P802.11s D11.0, Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 10: Mesh Networking, Apr. 2011.

Wang, et al., "IEEE 802.11s wireless mesh networks: Framework and challenges" Ad Hoc Networks 6, Elsevier, Aug. 2008, pp. 970-984.

* cited by examiner

US 8,879,452 B2

WIRELESS BEACON RECEPTION

This application claims the benefit of U.S. Provisional Application No. 61/538,536 filed Sep. 23, 2011, the entire contents of which are incorporated herein by reference.

TECHNICAL FIELD

This disclosure relates generally to wireless networking. More specifically, this disclosure relates to techniques for reducing power consumption of a client device operating to communicate with an access point of a wireless network.

BACKGROUND

A wireless network may comprise an access point and at least one client device. The access point may be coupled to a network, such as the Internet, and enable the client device to communicate via the network (and/or communicate with other devices coupled to the access point). In some examples, the wireless access point may send data to the at least one client device in the form of one or more packets.

In some examples, to reduce power consumption, a client device may operate in a low power consumption mode (e.g., a sleep mode) in some circumstances, such as when the client device is not being used for communications (e.g., with the access point). In some examples, such as a wireless networks configured to communicate using one or more of the 802.11X (e.g., 802.11b, 802.11g, 802.11n) standards for WI-FI communications, a client device may periodically awake from a low power consumption mode, and receive a beacon from an access point. The beacon may include information regarding present or future communications between the client device and the access point. According to one example, the beacon may include a delivery traffic identification (DTIM) message that indicates whether packets of data are waiting to be communicated to the client device.

SUMMARY

This disclosure is directed to techniques for reducing power consumption of a client device of a wireless network by causing the device to operate in a low power mode of operation before an entire beacon is received by the client device. For example, according to the techniques of this disclosure, a client device may awake from a low power mode of operation (e.g., a sleep mode), and receive a first portion of a beacon. The first portion of the beacon includes a delivery traffic identification message (DTIM). The client device may determine whether the DTIM message indicates one or more packets of data are forthcoming from the access point (e.g., waiting to be sent to the client device). If the DTIM message indicates no packets of data are forthcoming from the access point, the client device may return to a low power consumption mode of operation, before receiving a second portion of the beacon. Accordingly, an amount of time the client device operates in the low power mode may be increased, which may thereby reduce power consumed by the client device to communicate with the access point.

For example, method of operating a client device to communicate with a wireless network access point is described herein. The method includes receiving, by a client device from a wireless network access point, a first portion of a beacon that includes a delivery traffic identification (DTIM) message. The method further includes determining, based on the DTIM message, whether or not one or more packets of data are forthcoming from the access point. The method further includes if no packets of data are forthcoming from the access point, operating the client device in a low power mode of operation before a second portion of the beacon is received by the client device.

According to another example, a client device configured to communicate with a wireless access point is described herein. The client device includes a communications module configured to receive a first portion of a beacon that includes a delivery traffic identification (DTIM) message. The client device further includes a data processing module configured to: determine, based on the DTIM message, whether or not one or more packets of data are forthcoming from the access point. The client device further includes a power mode module configured to, if no packets of data are forthcoming from the access point, operate the client device in a low power mode of operation before a second portion of the beacon is received by the client device.

According to another example, a client device configured to communicate with a wireless access point is described herein. The client device includes means for receiving a first portion of a beacon that includes a delivery traffic identification (DTIM) message. The client device further includes means for determining, based on the DTIM message, whether or not one or more packets of data are forthcoming from the access point. The client device further includes means for, if no packets of data are forthcoming from the access point, operating the client device in a low power mode of operation before a second portion of the beacon is received by the client device.

According to another example, a computer-readable storage medium is described herein. The computer readable storage medium stores instructions configured to cause a computing device to receive, by a client device from an access point, a first portion of a beacon that includes a delivery traffic identification (DTIM) message. The instructions further cause the computing device to determine, based on the DTIM message, whether or not one or more packets of data are forthcoming from the access point. The instructions further cause the computing device to, if no packets of data are forthcoming from the access point, operate the client device in a low power mode of operation before a second portion of the beacon is received by the client device.

The details of one or more examples of this disclosure are set forth in the accompanying drawings and the description below. Other features, objects, and advantages of the techniques described herein will be apparent from the description and drawings, and from the claims.

DETAILED DESCRIPTION

Figure 1:
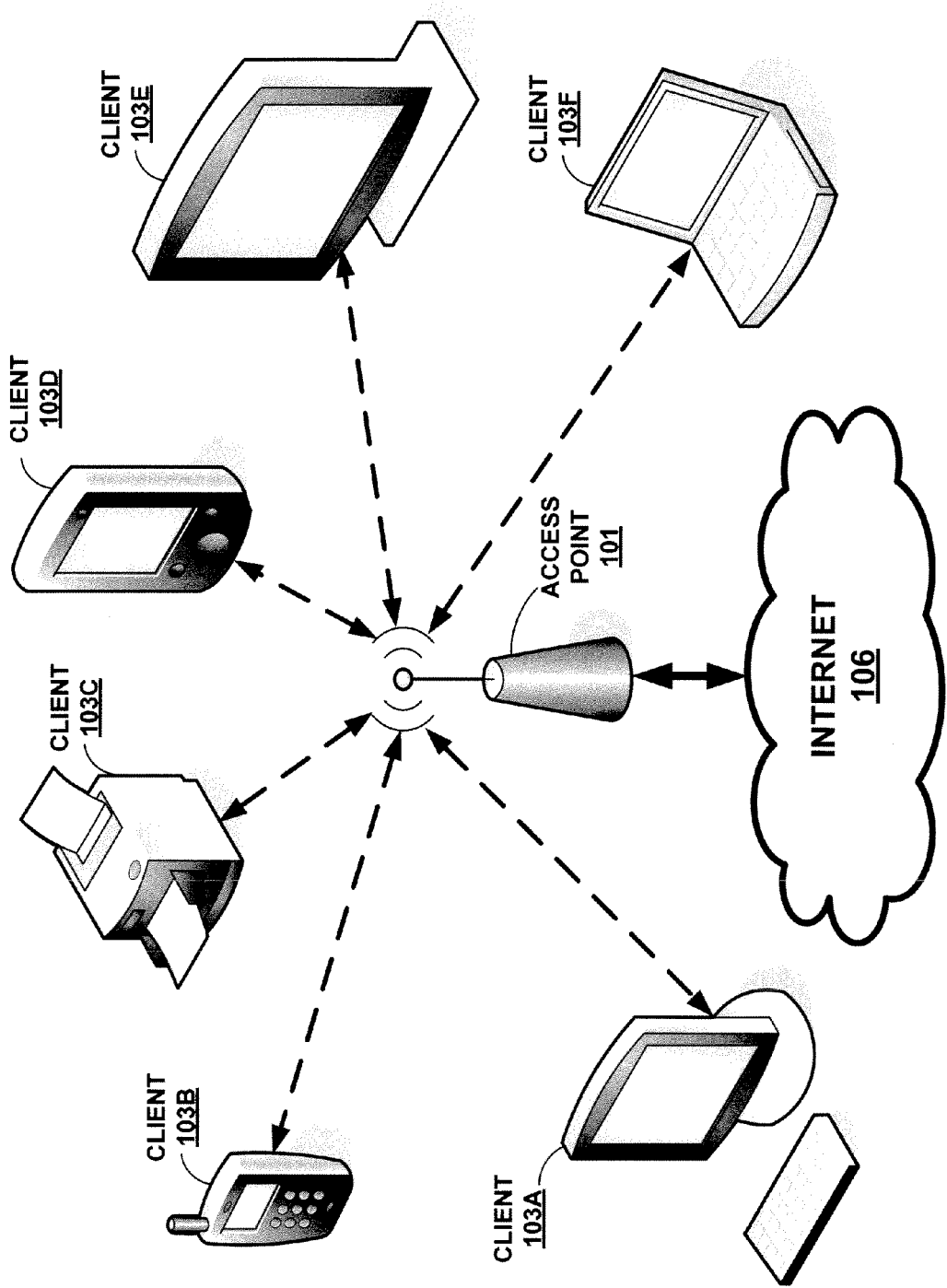
FIG. 1 is a conceptual diagram that illustrates one example of an access point configured to generate a wireless network.

FIG. 1 is a conceptual diagram that illustrates one example of a wireless access point 101. Generally speaking, access point 101 may comprise one or more devices operative to generate a wireless local area network (WLAN) to communicatively couple one or more of client devices 103A-103F with one or more other computing devices (not shown in FIG. 1) via a larger, non-local network, such as a wide area network (WAN), or such as Internet 106, which is sometimes referred to as a global computer network. According to the non-limiting example of FIG. 1, access point 101 is configured to generate a local wireless network for one or more of a desktop computer 103A, a mobile phone 103B, a printer 103C a smart phone or tablet computing device 103D a television display 103E, and a laptop computer 103F. Access point 101 may also or instead operate to enable many other types of devices not specifically shown in FIG. 1 to communicate with one another via the local wireless network and/or Internet 106, and/or with other devices via Internet 106. For example, client devices 103A-103F may include any device that includes a communications module configured to enable the respective client device to wirelessly communicate with access point 101. According to one such example, where access point 101 is configured to generate a wireless local area network, such as an IEEE 802.11x, or so-called WI-FI network, wireless client devices 103A-103F may include any device with a WI-FI component (e.g., application specific integrated circuit (ASIC), field programmable gate array (FPGA), discrete logic and/or software executable by a processing device) configured to enable WI-FI communications with access point 101.

Access point 101 may use a wired or wireless communications protocol to establish a communications link with Internet 106, and/or with a wide area network. For example, access point 101 may utilize one or more of a cable modem, a digital service link (DSL) modem, an optical communications link such as a T1 or T3 line, or any other form of wired communications protocol to communicatively couple access point 101 to Internet 106. According to other examples, access point 101 may be wirelessly coupled to Internet 106. For example, access point 101 may be wirelessly coupled to Internet 106 via a cellular communications network (e.g., 3G, 4G), satellite communications network, or other form of wireless communications that enables access point to communicate via Internet 106.

In some examples, access point 101 may include a device specifically configured to communicatively couple one or more client devices 103A-103F to Internet 106, such as a wired (e.g., Ethernet) or wireless (e.g., WI-FI) router, or a cellular to WI-FI hotspot device. According to other examples, access point 101 may comprise a more general purpose computing device (e.g., such as one or more of client device 103A-103F) configurable to generate a local network. For example, access point 101 may comprise a mobile phone or tablet computer configured to generate a WI-FI wireless network from a wireless cellular network connection. In some examples, one or more devices 103A-103F may also further be configurable to operate as a client device, an access point, or both simultaneously, consistent with the techniques described herein.

In some examples, one or more of client devices 103A-103F may communicate with access point 101 via a wired or wired connection. For example, when a cable (e.g., an Ethernet cable, USB cable, or the like) is coupled between the respective client device 103A-103F and access point 101, the client device may use a wired communications protocol (e.g., ETHERNET, UNIVERSAL SERIAL BUS (USB)) to communicate with access point 101. However, when such a cable is not coupled between the respective client device 103A-103F and access point 101, the client device may transition instead use a wireless network (e.g., WI-FI) generated by access point 101 to communicate with access point 101.

In some examples, where access point 101 is configured to generate a local wireless network, access point 101 may communicate with one or more of client devices 103A-103F by sending data arranged into one or more packets. For example, access point 101 may send to one or more of client device 103A-103F one or more packets of data received from another computing device accessible via Internet 106, or from another of client devices 103A-103F. Access point 101 may also be configured to receive one or more packets of data from one or more of client devices 103A-103F, and send the one or more received packets to another computing device accessible via Internet 106, and/or another of the one or more client devices 103A-103F.

In some examples of wireless communication techniques, such as one or more of the IEEE 802.11X (e.g., 802.11a, b, g or n) standards for WI-FI communications, some client devices 103A-103F may be configured to operate in a low power consumption (sleep) mode, when the client device is not actively operating to communicate. According to such a low power mode, the client device 103A-103F may modify operation of one or more components of the client device. For example, a client device 103A-103F operating in such a low power consumption mode may turn off (e.g., disconnect from a power supply) one or more components (e.g., communications modules of the client device) that operate to enable communications with access point 101 or another device (e.g., one or more other client devices 103A-103F). In other examples of such a low power consumption mode, the client device may also or instead modify operation of the client device by operating one or more components at a lower voltage and/or lower operating power and/or speed than in an active mode of operation.

In some examples, a client device 103A-103F may periodically awake from a low power mode, to receive a beacon from access point 101. Such a beacon may be provided by a wireless signal, and may include information regarding further communications with the access point 101. For example, each beacon may include a plurality of information elements (IEs) that may each indicate, to or more of client devices 103A-103F, information regarding present or future communications with access point 101. For example, the plurality of IEs may indicate if and/or or when further communications from access point 101 are expected to be sent to one or more of client devices 103A-103F, among other information.

In some examples, access point 101 may send one or more of client devices 103A-103F a beacon that includes an IE that comprises a delivery traffic identification message (DTIM message). The DTIM message may indicate whether access point 101 has one or more packets of data to communicate to the client device 103A-103F.

According to some techniques for wireless communication (e.g., the 802.11X WI-FI standards), a client device may periodically awake from sleep to receive a beacon from an access point, and remain in an active state until all the data of the beacon (e.g., all IE of the beacon) have been received and/or processed by the client device. Once all the data has been received by the client device, the client device may then verify the received data, such as by performing a frame check sequence (FCS, e.g., including a cyclic redundancy check (CRC)) on the received beacon. Once the data of the beacon has been verified, the client device may or may not use the verified data to operate the client device (e.g., to configure the client device for further communication with the access point).

After receiving the entire beacon and performing the FCS check on data of the beacon, the client device may return to the low power consumption mode of operation described above, if no packets of data are forthcoming from the access point. However, if the DTIM message of the beacon indicates that there are packets of data forthcoming (e.g., waiting to be sent to the client device) from the access point, the client device may remain in an active mode (not return to a low power consumption mode) after receiving the beacon, to receive the forthcoming packets.

In some examples, a beacon may be relatively large (e.g., a relatively large number of bits of data). According to these examples, a client device may remain in an active state for a significant amount of time to receive and/or process a beacon. In some examples, periodically waking to receive an entire beacon may cause an undesirable drain on power resources of a client device. In some examples, power consumption of a client device may be reduced by reducing the wake-up frequency at which the client device awakens from a low power consumption mode to receive beacons from the access point. This approach, however, may cause a reduction in the rate at which data is communicated, because the transmission of packets from the access point may be delayed due to the reduced wake-up frequency of the client device.

This disclosure is directed to techniques for, instead of receiving an entire beacon from an access point 101 as described above, receiving, at a client device 103A-103F, may only receive only a first portion of the beacon that includes a DTIM message. Based on the first portion of the beacon (e.g., based on the DTIM message), the client device 103A-103F may determine whether or not packets of data are forthcoming from access point 101. If one or more packets of data are forthcoming from access point 101, e.g., as indicated by the DTIM message, the client device 103A-103F may remain in an active state and receive a second portion of the beacon. However, if the client device 103A-103F determines, based on the DTIM message, that no packets of data are forthcoming from access point 101, the client device 103A-103F may operate in a low power consumption mode, and thereby avoid receiving and/or processing the second portion of the beacon. For example, the client device 103A-103F may not receive the second portion of the beacon, by not processing (e.g., not reading and/or not storing in a memory) the second portion of the beacon. According to other examples, the client device may not receive the second portion of the beacon, by turning off (e.g., disconnecting from a power supply) one or more communications components (e.g., a WI-FI integrated circuit) of the client device 103A-103F, such that the one or more communications components do not receive the second portion of the beacon.

In this manner, the client device 103A-103F may not receive and/or process the second portion of the beacon. Accordingly, the client device 103A-103F may remain in a low power consumption state longer than according to other techniques described above. As such, power consumed by the client device 103A-103F to communicate with access point 101 may be reduced in comparison to other techniques.

Figure 2:
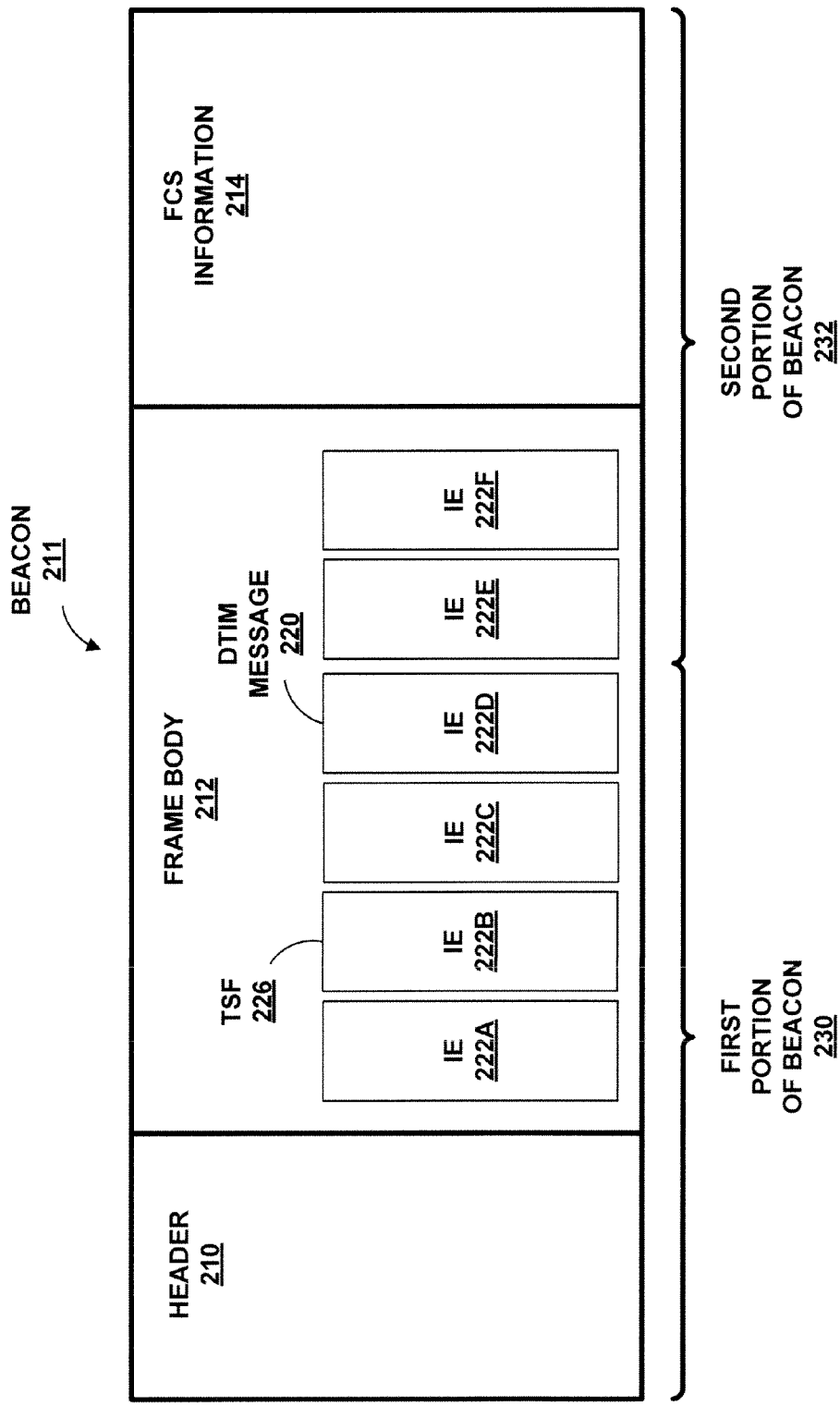
FIG. 2 is a conceptual diagram that illustrates one example of a wireless beacon that may be communicated by an access point to a client device.

FIG. 2 is a conceptual diagram that illustrates one example of a beacon 211, at least a portion of which may be received and/or processed by a client device 103A-103F according to the techniques described herein. Generally speaking, beacon 211 may be periodically transmitted by a wireless access point (e.g., access point 101 depicted in FIG. 1) to a wireless client device (e.g., one or more of client devices 103A-103F depicted in FIG. 1). The beacon may include information regarding the further communication of data by wireless access point 101 to client device 103A-103F, as well as other information.

In some examples, beacon 211 may be arranged according to one or more of the 802.11X standards for WI-FI communications. In other examples, beacon 211 may be arranged according to one or more other standards for wireless communication not directly described herein.

According to the example of FIG. 2, beacon 211 includes a header 210, a body 212, and FCS information 214. In some examples, access point 101 may first send header 210 to a client device 103A-103F. Header 210 may include information regarding one or more other components of beacon 211. For example, header 210 may indicate what information is included in beacon 211, a location of particular information within beacon 211, a length of beacon 211, and/or other information. As shown in FIG. 2, beacon 211 also includes a body 212. Body 212 may include a plurality of information elements (IEs) 222A-222F, that each may indicate information regarding further communications between access point 101 and the client device 103A-103F. For purposes of explaining the techniques of this disclosure, beacon 211 depicted in FIG. 2 includes six IEs 222A-222F. In other examples, beacon 211 may include more, or fewer, IEs. For example, according to at least some of the 802.11X standards for WI-FI communications, beacon 211 may include forty, fifty, or more IEs. In some examples, it may be undesirable for a client device 103A-103F to remain awake to receive an entire beacon 211 from access point 101, where power resources of the client device 103A-103F are limited.

As also shown in FIG. 2, IE 222D comprises a DTIM message 220 as described herein. The other IE 222A-222C and 222E-222F of beacon 211 depicted in FIG. 2 may comprise other messages (e.g., a TSF IE 226 or other messages) regarding communications between access point 101 and one or more client devices 103A-103F. DTIM message 220 may indicate, to a client device 103A-103F, whether or not access point 101 has one or more packets of data to send to the client device 103A-103F. According to at least some aspects of this disclosure, the client device 103A-103F may identify DTIM message 220 based on information of header 210 and/or header information of IE 220D, and process DTIM message 220 to determine whether access point 101 has any packets to send to the client device. According to the example of FIG. 2, header 210 and IEs 222A-222D may be considered a first portion 230 of beacon 211 as described herein. Also according to the example of FIG. 2, a remaining portion of beacon 211 (e.g., the remaining IEs 222E-222F of beacon 211, and FCS information 214 of beacon 211), may be considered a second portion 232 of beacon 211 as described herein.

According to the techniques described herein, client device 103A-103F may first receive and/or process header portion 210 of beacon 211. Client device may further receive and/or process IEs 222A-222C. The client device 103A-103F may then receive IE 222D, which is a DTIM message 220. The client device 103A-103F may determine, based on the DTIM message 220, whether or not one or more packets of data are forthcoming from access point 101. If no packets are forthcoming from access point 101, client device 103A-103F may not receive second portion 232 of beacon 211. For example, client device 103A-103F may not receive and/or process a second portion 232 of beacon 211 that includes all IE's of a beacon 211, as shown in FIG. 2. In other examples, client device 103A-103F may not receive and/or process a second portion 232 of a beacon 211 that comprises some, but not other, IE's that follow DTIM message 220 in beacon 211. For example, client device 103A-103F may receive and/or process IE 222E, which follows DTIM message 220, and not receive and/or process a second portion of beacon 211 that includes IE 222F, other IE of beacon 211 not depicted in FIG. 2, and/or FCS information 214.

For example, client 103A-103F may not receive second portion 232 of beacon 211 by entering a low power mode of operation (e.g., turn off one or more communications modules such that further data of beacon is not received by client device 103A-103F), before receiving second portion 232 of beacon 211. According to other examples, client device 103A-103F may not receive second portion 232 of beacon 211 by not operating to process (e.g., read and/or store in a memory) second portion 232 of beacon 211.

In this manner, client device 103A-103F may enter the low power mode of operation, before receiving and/or processing IEs 222E-222F, and FCS information 224. As such, client device 222A-222F may operate in a low power consumption mode for longer in comparison to other techniques, where all of beacon 211 is received and processed by the client device 103A-103F, as described above.

In some examples, data of a beacon 211 communicated by access point 101 may become corrupted. For example, due to signal interference or other disturbances, one or more IE 222A-222F of beacon may not indicate what was intended when processed and/or sent by access point 101.

As described above, in some examples, if a client device 103A-103F determines that there are no packets of data forthcoming from access point 101, client device 103A-103F may operate in a low power consumption mode before receiving second portion 232 of beacon 211. In some examples, such a non-received/processed second portion 232 of a beacon may include FCS information 214, which may be used by the client device 103A-103F to perform an FCS check to validate data of beacon 211. According to the techniques of this disclosure, the client device 103A-103F may not perform an FCS check on beacon 211, if DTIM message 220 indicates that there are no packets of data forthcoming from access point 101.

As shown in FIG. 2, beacon 211 includes an IE 222B that comprises a timing synchronization function (TSF) 226. The TSF 226 may indicate, to a client device 103A-103F, when the client device should awake from a low power mode of operation to receive at least one further beacon from access point 101. For example, TSF 226 may indicate a counter value, such as a 64-bit timer counter with micro second resolution. Client device 103A-103F may use TSF 226 to synchronize a TSF timer counter internal to client device 103A-103F with a TSF timer counter of access point 101. In some examples, client device 103A-103F may use TSF 226 to synchronize operation with access point 101, for example, to compensate for clock drift between internal clock references (e.g., crystal oscillators) of the client device 103A-103F and the access point 101. In some examples, client device may use TSF 226 to determine when to awake from sleep to receive one or more further beacons from access point 101.

According to one example, to avoid using TSF 226 of beacon 211 when no FCS check is performed on beacon 211 to ensure TSF 226 is not corrupted, the client device 103A-103F may instead utilize a previously determined clock reference for operation. For example, client device 103A-103F may not update an internal clock reference (e.g., generated by a crystal oscillator) of the client device based on the received TSF 226. By using the internal clock reference, the client device 103A-103F may avoid using a corrupted TSF 226 to synchronize client device 103A-103F, which may undesirably affect operation of the client device 103A-103F.

According to another example, a client device 103A-103F may, for some received beacons of a plurality of received beacons that include a DTIM 220 that indicates no packets are forthcoming, remain in an active state and receive and/or process second portion 232 of beacon 211. For example, the client device 103A-103F may, for a subset of received beacons 211 (e.g., every fifth received beacon 211), receive and/or process the entire beacon (e.g., including the second portion 232 of the beacon including FCS information 214), and perform an FCS check on the beacon to ensure the validity of data (e.g., one or more of IE 222A-222F) of the beacon 211, even if the beacon includes a DTIM 220 that indicates no packets of data are forthcoming from access point 101. If the FCS check indicates that data of beacon 211 has not been corrupted, the client device 103A-103F may use at least some data of beacon 211. For example, the client device 103A-103F may use TSF 226 of beacon 211 to synchronize operation of the client device 103A-103F for communication with access point 101. According to this example, client device 103A-103F may utilize less power resources to receive a plurality of beacons 211, because client device 211 may only remain active to receive an entire beacon for some received beacons 211.

According to still other examples, a client device 103A-103F may determine whether or not to use data of a beacon 211, without receiving an entire beacon and without performing an FCS check as described above. According to these examples, the client device 103A-103F may compare a value associated with data of a received first portion of a beacon (e.g., a value of an IE 222A-222F) to at least one threshold, and determine whether to use the data of the received beacon based on the comparison. For example, the at least one threshold may be based on an expected value of the data (e.g., expected value of the at least one IE 222A-222F). In some examples, such a threshold may be based on a predetermined value stored in memory. According to other examples, such a threshold may be automatically determined, such as based on one or more values associated with data of one or more previously received beacons.

According to one specific example, a client device 103A-103F may determine whether to use a TSF 226 of a received beacon, based on comparison of a value of the TSF 226 IE to at least one predetermined or automatically determined threshold. For example, the client device 103A-103F may compare a value of a received TSF 226 to a predetermined threshold stored in memory to determine whether to use the TSF 226 to synchronize operation of the client device 103A-103F. According to another example, the client device 103A-103F may determine such a threshold automatically based on previously determined values of one or more TSF 226 of one or more previously received beacons 211.

As described above, in some examples, a beacon may be much longer than beacon 211 depicted in FIG. 2. For example, a beacon may include many more IE than the six IE 222A-222F depicted in FIG. 2. In some examples, a beacon may be arranged such that DTIM message 220 towards a front of the body 212 of a beacon. For example, a DTIM message 220 may be arranged as one of the first five or ten IE of the body 212 of a beacon that may include forty to sixty IEs.

The techniques of this disclosure may be advantageous, because they may permit a client device 103A-103F to determine whether or not further packets of data are forthcoming from access point 101, without remaining in an active state for a period of time needed to receive and/or process an entire beacon each time a beacon is received. As such, the client device 103A-103F may operate in low power consumption mode for more time in comparison with other techniques, where the entire beacon is received and/or processed, for each received beacon. Accordingly, client device 103A-103F may consume less power to communicate data with access point 101 in comparison to other techniques.

Figure 3:
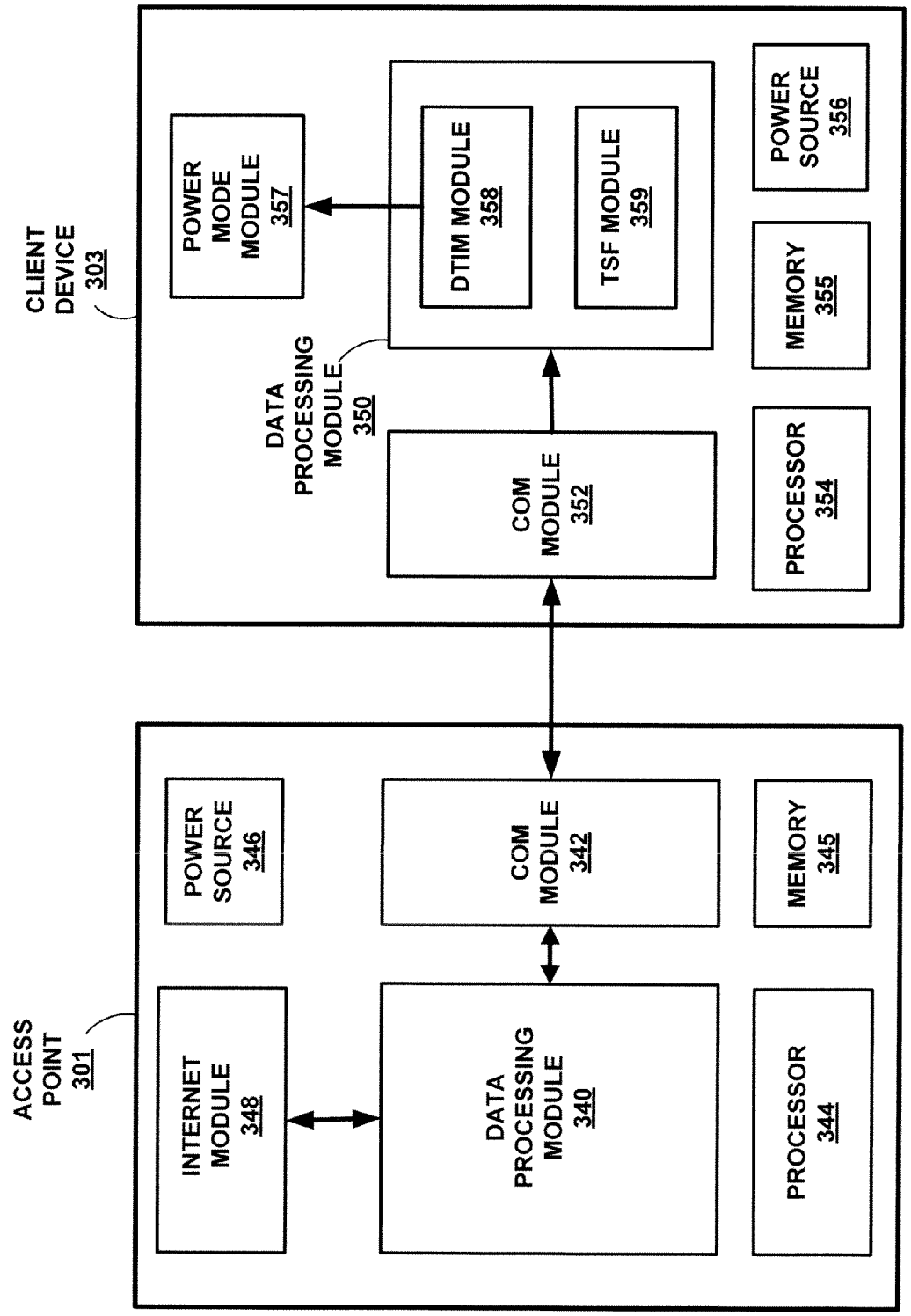
FIG. 3 is a block diagram that illustrates one example of an access point and a client device configured to operate according to the techniques described herein.

FIG. 3 is a block diagram that illustrates one example of a wireless client device 303 configured to communicate with an access point 301 consistent with the techniques described herein. As shown in FIG. 3, access point 301 includes an Internet module 348, a power source 346, a processor 344, a memory 345, a data processing module 340, and a communications module (COM module) 342.

Memory 345 may include any component of access point 301 configured to store data. For example, memory 345 may include a temporary memory, such as one or more random access memory (RAM) components or other short-term data storage component. According to other examples, memory 345 may include one or more long-term storage components, such as a magnetic hard drive, FLASH memory component, or other long-term data storage component.

Processor 344 may comprise one or more components of access point 301 configured to execute instructions (e.g., instructions stored in memory 345). Processor 344 may comprise, for example, a general purpose computing component (e.g., a central processing unit (CPU), graphics processing unit (GPU)), or other computing component configured to execute instructions stored in memory 345 to operate according to the techniques described herein. For example, functionality described with respect to one or more of data processing module 340, COM module 342, and Internet module 348 may at least in part, comprise instructions executable by processor 344 to cause processor 344 to operate consistent with the techniques described herein. In other examples, functionality one of more components of access point 301 described herein may be implemented using one or more components specifically configured to perform the described functionality. For example, one or more components of access point 301 described herein may comprise one or more components (e.g., application specific integrated circuit (ASIC), field programmable gate array (FPGA), discrete logic component) specifically configured or arranged to operate according to the techniques described herein.

Internet module 348 may be configured to enable access point 301 to communicate via a larger network, such as the Internet. For example, as described above, Internet module 348 may include one or more hardware or software components configured to enable access point 301 to communicate with via the Internet using a wired communications protocol. For example, Internet module 348 may include a modem internal or external to access point 301, such as a cable, DSL, T1, or T3 modem configured to enable access point 301 to communicate via a network, such as the Internet. According to other examples, Internet module 348 may enable access point 301 to communicate with a network, such as the Internet, wirelessly. For example, Internet module 348 may comprise one or more hardware or software components of access point 301 configured to enable access point to communicate wirelessly (e.g., via a 3G or 4G cellular network) via a network, such as the Internet.

As depicted in FIG. 3, access point 301 includes a power source 346. Power source 346 may comprise any source of energy configured to power one or more components of access point 301 for operation. For example, power source 346 may comprise an electrical coupling to an external power source (e.g., a wall outlet). According to other examples, for example where access point 301 is a mobile device configured to operate as a wireless access point, power source 346 may comprise an external power source as described above and/or a battery or other form of energy storage component internal to or external from access point 301.

As depicted in FIG. 3, access point 301 further includes a data processing module (DPM) 340, and a communication (COM) module 342. Generally speaking, DPM 340 may receive data from another computing device via Internet module 348, and process data received from Internet module 348. DPM 340 may send data to client device 303 via COM module 342. For example, DPM 340 may arrange data received via Internet module 348 in one or more packets to be sent to client device 303 wirelessly via COM module 342. According to one specific example, DPM 340 may arrange received data in one or more packets according to one or more of the 802.11X standards for WI-FI wireless communications. In some examples, DPM 340 may also be configured to receive and process data received from client device 303 via COM module 342. For example, DPM 340 may process one or more packets of data or instructions from client device 303, and send data or instructions from the one or more received packets to another computing device, e.g., via Internet module 348.

Beacon 211 may include information regarding further communications from access point 301. In some examples, beacon 211 includes a header 210, a body 212 (e.g., that includes a plurality of information elements (IE) 222A-222F), and FCS information 214. In some examples, as depicted in FIG. 2, beacon 211 includes a DTIM message 222D that indicates, to client device 303, whether packets of data or instructions are forthcoming (e.g., whether one or more packets of data or instructions are to be sent to client device 303.

In some examples, as also depicted in FIG. 2 beacon 211 may also include a timing synchronization function (TSF) 226 (IE 222B). The TSF 226 may be used by client device 303 to determine when the client device 303 should awake from a low power mode of operation to receive at least one further beacon from access point 301. For example, TSF 226 may indicate a counter value, such as a 64-bit timer counter with micro second resolution. Client device 303 may use TSF 226 to synchronize a TSF timer counter internal to client device 303 with a TSF timer counter of access point 301. In some examples, client device 303 may use TSF 226 to synchronize operation with access point 101, for example, to compensate for clock drift between internal clock references (e.g., crystal oscillators) of the client device 303 and the access point 301. In some examples, client device may use TSF 226 to determine when to awake from sleep to receive one or more further beacons from access point 301.

In some examples, DPM 340 may store received data in memory 345, prior to sending the received data to client device 303 in the form of one or more packets of data. In some examples, DPM 340 may communicate one or more packets of data stored in memory 345 to client device 303, after access point 301 has sent client device 303 a beacon 211 that includes a DTIM message 220 that indicates the one or more packets of data stored in memory 345 are forthcoming from access point 301. In some examples, the client device 303 may by synchronized to awaken from a low power consumption mode to receive the beacon, based on at least one TSF 226 of at least one previously received beacon 211.

As shown in FIG. 3, client device 303 includes a communications module (COM module) 358, a processor 354, a memory 355, a data processing module (DPM) 350, a power source 356, and a power mode module (PMM) 357.

Memory 355 may include any component of client device 303 configured to store data. For example, memory 355 may include a temporary memory, such one or more random access memory (RAM) components or one or more other short term data storage components. According to other examples, memory 355 may include one or more long-term storage components, such as one or more magnetic hard drives, FLASH memory components, or one or more other long-term data storage components.

Processor 354 may comprise one or more components of client device 303 configured to execute instructions (e.g., instructions stored in memory 355). Processor 354 may comprise, for example, a general purpose computing component (e.g., a central processing unit (CPU), graphics processing unit (GPU)), or other computing component configured to execute instructions stored in memory 355 to cause client device 303 to operate as described herein. For example, functionality described with respect to one or more of data processing module 350, DTIM module 358, TSF module 359, PMM 357, and/or COM module 352 may at least in part, comprise instructions executable by processor 344 to cause processor 344 to operate cause client device 303 to operate consistent with the techniques described herein. In other examples, one of more modules of access point 301 described herein may also or instead be implemented, at least in part, using one or more components specifically configured to perform the functionality described herein. For example, one or more modules of client device 303 described herein may comprise one or more components (e.g., application specific integrated circuit (ASIC), field programmable gate array (FPGA), discrete logic component) specifically configured or arranged to operate according to the techniques described herein. The various modules of client device 303 described herein may be implemented using any combination of hardware, software, firmware, discrete logic components.

As one specific example, COM module 358 may include instructions executable by processor 358 to cause client device 303 to communicate with access point 301 and/or one or more circuits specifically configured to cause client device 303 to communicate with access point 301. For example, COM module 358 may include one or more components (e.g., a WI-FI integrated circuit (WI-FI IC) configured to enable client device 303 to communicate using one or more of the 802.11 standards for WI-FI communication.

Power source 356 may include any component of client device 303 configured to store or access power to operate one or more components of client device 303, such as COM module 358, DPM 350, PMM 357, or other component of client device 303. In some examples, power source 356 of client device 303 may include limited power source, such as a battery. In other examples, power source 356 may comprise an external power source, such as an external coupling to a wall outlet, or a battery external to client device 303. In some examples, where client device 303 uses a limited power source such as an internal battery, it may be desirable to minimize power consumption of client device 303, in order to increase a battery life of client device 303.

To reduce power consumption of client device 303, PMM 357 depicted in FIG. 3 may operate client device 303 in different modes of operation. For example, PMM 357 may cause client device 303 to operate in an active mode, or a low power consumption mode to reduce power consumption of client device 303. According to such a low power consumption mode, one or more components of client device 303 may be turned off, and/or operated at a slower rate and/or with a reduced power supply (e.g., a reduce supply voltage and/or current) in comparison to an active mode of operation. For example, in an active mode of client device 303, PMM 357 may cause COM module 358 (e.g., a WI-FI integrated circuit (IC) of client device 303 to be turned on (e.g., connected to power source 356) such that client device 303 may communicate with access point 301. According to this example, in a low power consumption mode, PMM 357 may turn off COM module 358, such that COM module 358 may consume little or no power from power source 356. For example, according to the low power consumption module, PMM 357 may disconnect COM module 358 from power source 356, such that COM module 356 may not consume any power. According to other examples, according to a low power consumption mode, PMM 357 may cause DPM 350 not to process data received by access point 301.

As shown in FIG. 3, DPM 350 includes a DTIM module 358. According to the techniques described herein, DPM 350 may receive a header 210 of a beacon 201 as depicted in FIG. 2. DPM 350 may then begin receiving IE 222A, 222B, 222C, and 222D. DTIM module 358 may determine that IE 222D comprises a DTIM message 220. For example, DTIM module 358 may determine that IE 222D is a DTIM message 220 based on information of header 210, or information in a header of IE 222D. DTIM module 358 may further determine, based on the DTIM message 220, whether one or more packets of data are forthcoming from access point 301. If the DTIM message 220 indicates that one or more packets of data are forthcoming from access point 301, client device 303 may continue to operate in an active mode, to receive the forthcoming packets of data (and/or second portion 232 of beacon 211). Otherwise, if one or more packets of data are not forthcoming from access point 301, DTIM module 358 may cause client device 303 to be operated in a low power consumption mode (e.g., via PMM 357). Accordingly, client device 303 may not receive second portion 232 of beacon 211. For example, in the low power mode of operation, PMM 357 may cause COM module 352 to be turned off (e.g., disconnected from power source 356) such that second portion of 232 of beacon 211 is not received by client device 303. According to another example, in the low power mode of operation, PMM 357 may cause DPM 350 not to process data of the second portion 232 of beacon 211, such that the second portion 232 of beacon 211 is not received by DPM 350.

As also shown in FIG. 3, client device 303 may, in some examples, also include a timing synchronization function (TSF) module 359. As described above with respect to FIG. 2, in some examples, a beacon 211 may include a TSF 226. Client device 303 (e.g., DPM 350) may utilize a received TSF 226 to synchronize operation of client device 303. For example, client device 303 may use the received TSF 226 to synchronize client device for operation. Based on such synchronization, client device may, for example, awaken to receive one or more further beacons from access point 301.

In some examples, as described above, because DTIM module 258 may operate client device 303 in a low power consumption mode without receiving second portion 232 of beacon 211, client device 303 may not receive FCS information 214. As such, client device 303 may not perform an FCS check on data (e.g., IE 222A-222F) of beacon 211 in order to validate the data has not become corrupted.

Generally speaking, TSF module 359 may cause client device 303 to operate to receive further beacons from access point 301, without performing an FCS check on each beacon 211 received by client device 303. According to one such example, TSF module 359 may cause client device 303 to operate using a previously determined internal clock reference of the client device, instead of synchronizing the internal clock reference using a TSF 226 of a received beacon 211 to synchronize operation of the client device 303. According to these examples, by using the previously determined internal clock reference to synchronize operation of the client device 103A-103F, instead of synchronizing the internal clock reference using TSF 226 of beacon 211, client device 303 may avoid using a corrupted TSF 226, which may undesirably effect operation of client device 303.

According to another example, TSF module 359 may, for at least some received beacons 211 that include a DTIM message 220 that indicates no packets are forthcoming, cause client device 303 to remain in an active state and receive and/or process second portion 232 of beacon 211. For example, client device 303 may, for a subset of received beacons 211, receive and/or process the entire beacon (e.g., including the second portion 232 of the beacon including FCS information 214), and perform an FCS check on the beacon 211 to ensure the validity of data (e.g., one or more of IE 222A-222F) of the beacon 211. For other received beacons, DTIM module 358 may cause client device 303 to operate in a low power consumption mode before receiving a second portion 232 of beacon 211, as described above.

According to some examples, TSF module 359 may determine whether or not to receive and/or process an entire beacon 211 and perform an FCS check on the beacon that includes a DTIM message 220 that indicates that no packets of data are forthcoming based on a predetermined interval. For example, such a predetermined interval may indicate that the client device 303 is to use a TSF 226 (e.g., receive, process, and/or perform an FCS check on beacon 211) of every fifth beacon to synchronize client device 303 for communication with access point 301. According to these examples, if the FCS check indicates that data of beacon 211 has not been corrupted, TSF module 359 may cause DPM 350 to use TSF 221 of beacon 211 to synchronize client device for receipt of further beacons 211 from access point 101.

According to still other aspects of this disclosure, TSF module 359 may determine whether or not to use a TSF 226 of a beacon 411 based on a value of the TSF 226. For example, DPM 350 may process a received TSF 226 to determine a counter value indicated by the TSF 226. According to these examples, TSF module 359 may compare the determined counter value, which may represent clock drift, to one or more thresholds. Such one or more thresholds may include a predetermined value, such as a value stored in memory, or a value dynamically determined based on a counter value of TSF 226 of one or more previously received beacons 211. Based on the comparison, TSF module 359 may cause client device 303 to use the determined counter value to synchronize operation of client device 303.

In some examples, a TSF 226 may be received prior to DTIM message 220, as depicted according to the example of FIG. 2. According to these examples, TSF module 359 may compare a received TSF 221 to one or more threshold described above and, based on the comparison, may use a counter value indicated by the TSF 221 to synchronize client device 303 (e.g., to synchronized one or more clocks of client device 303 to a clock reference of access point 303).

In other examples not depicted in FIG. 2, a TSF of a beacon may comprise an IE that follows the DTIM message in the beacon 211 (e.g., is communicated by access point 101 after DTIM message 220). According to these examples, for at least some received beacons 211, instead of DTIM module 358 causing client device 303 to operate in a sleep mode after receiving DTIM message 220, TSF module 359 may cause client device 303 to remain in an active mode until the TSF is received. Once TSF module 359 has determined a counter value of the TSF (and/or compare the determined counter value to at least one threshold), TSF module 359 may cause client device 303 to be operated in a low power consumption mode (e.g., via PMM 357).

Figure 4:
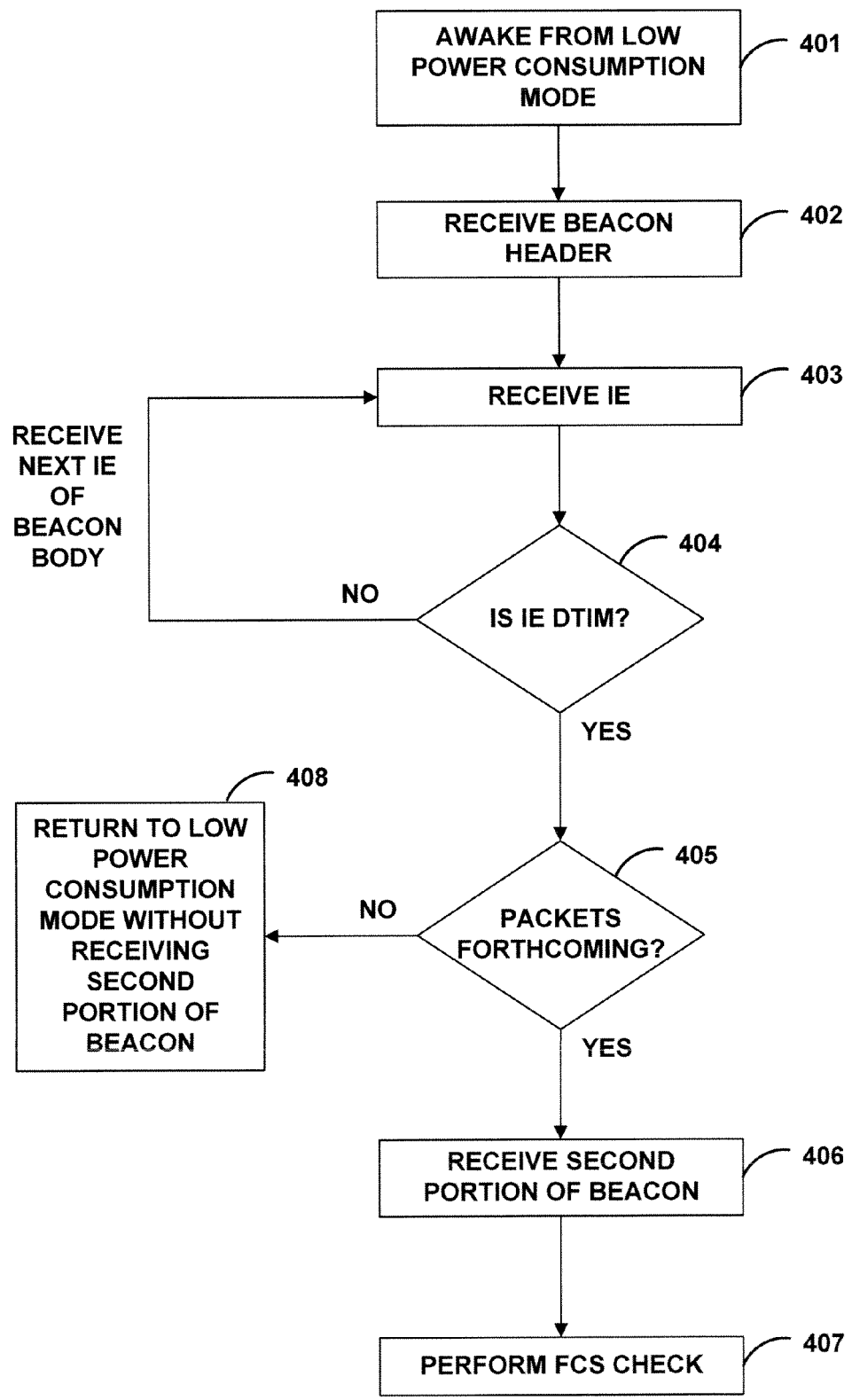
FIG. 4 is a flow diagram that illustrates one example of a method of operating a client device to receive a beacon consistent with the techniques described herein.

FIG. 4 is a flow diagram that illustrates one example of a method of operating a client device consistent with the techniques of this disclosure. The method depicted in FIG. 4 is described with respect to client device 303 depicted in FIG. 3, however other devices may also be used.

As shown in FIG. 4, client device 303 may awake from a low power consumption mode of operation (401). For example, the client device 303 may awake from the low power consumption mode to receive a beacon 211. The client device 303 may awake from the low power consumption mode to receive the beacon, based on previous synchronization of client device 303 with access point 301 (e.g., where client device 303 used one or more TSF 226 of one or more previously received beacons 211 to synchronize client device 303).

In some examples, the low power mode of operation may comprise turning off (e.g., disconnecting from power source 356) one or more communications modules 352 of client device 303. In some examples, waking client device 303 from the low power consumption mode may comprise turning on (e.g., connecting to power source) the one or more communications modules 352 of client device 303. In other examples, the low power mode of operation may comprise causing DPM 350 of client device 303 not to process received data. According to these examples, waking client device 303 from the low power consumption mode may comprise causing DPM 350 to process received data.

As also shown in FIG. 3, client device 303 may receive a header portion 210 of a beacon 211 (402). As also shown in FIG. 4, client device 303 may receive at least one information element (IE 222A-222D) of the beacon 211. For each received IE, the client device 303 may process the received IE to determine whether the IE comprises a DTIM MESSAGE 220 (403). For example, client device 303 may process a header of a received IE, to determine whether the IE is a DTIM message (404). If the received IE does not include a DTIM message 220, client device 303 may receive at least one other IE of the beacon 211 (403). However, if the IE does include a DTIM message 220, client device 303 may process the DTIM message 220 to determine whether one or more packets are forthcoming coming from access point 301 (405).

If client device 303 determines that one or more packets are forthcoming from access point 301, client device may remain in an active (awake) operation mode, to receive a remaining portion (e.g., second portion 232) of beacon 211 (406). For example, client device 303 may remain in an active state to receive one or more not yet received IE 222E, 222F of beacon 211. The second portion 232 of beacon 211 may include FCS information 214. According to some examples, as also shown in FIG. 4, client device 303 may further perform an FCS check (e.g., using received FCS information 214) on data of the beacon 211 (407).

In some examples, client device 303 may also remain in the active state to receive the one or more packets of data from access point 301. In some examples, once the one or more packets of data have been received by client device 303, client device 303 may return to the low power consumption mode of operation.

As also shown in FIG. 4, if client device 303 determines that no packets of data are forthcoming from access point 101, client device 303 may return to a low power consumption mode of operation, without receiving and/or processing a second portion 232 of the beacon 211 (408). For example, client device 303 may turn off one or more communications modules 352, before one or more IE 222E, 222F of beacon 211 and/or FCS information 214 are received and/or processed by client device 303. According to another example, client device 303 may not process a received second portion 232 the beacon 211.

Figure 5:
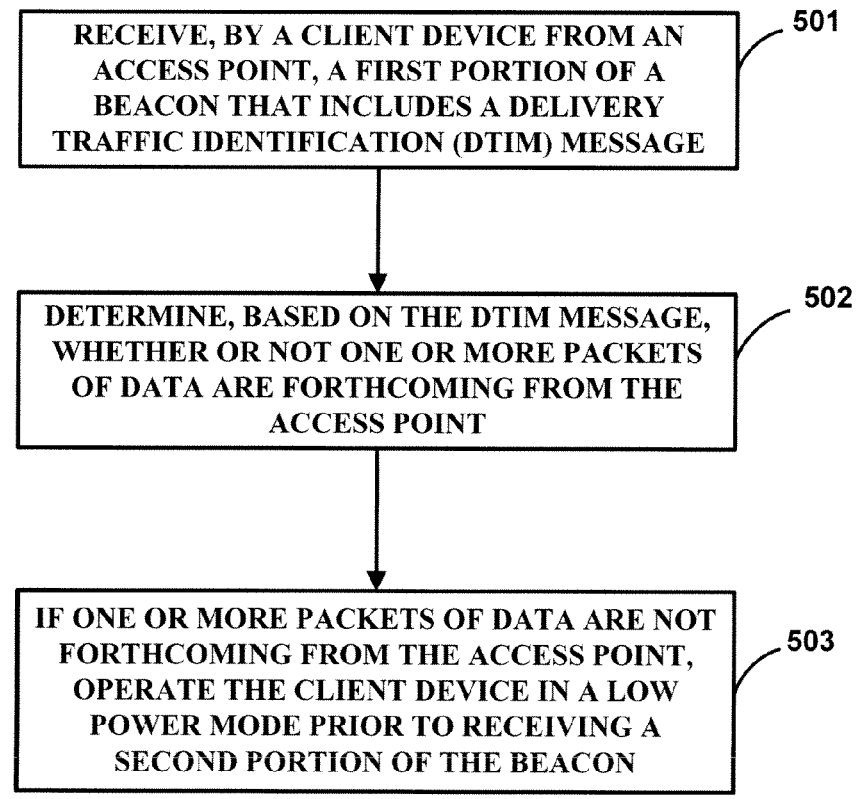
FIG. 5 is a flow diagram that illustrates one example of a method of operating a client device to receive a beacon consistent with the techniques described herein.

FIG. 5 is a flow diagram that illustrates one example of a method of operating a client device consistent with the techniques of this disclosure. The method depicted in FIG. 5 is described as performed by client device 303 in FIG. 3. However, other client devices may also be used.

As shown in FIG. 5, client device 303 receives, from an access point 301, a first portion 230 of a beacon 211 that includes a delivery traffic identification (DTIM) message (501). As also shown in FIG. 5, client device 303 determines, based on the DTIM message 220, whether or not one or more packets of data are forthcoming from the access point 301 (502). As also shown in FIG. 5, if one or more packets of data are not forthcoming from the access point 301, the client device may operate in a low power mode of operation, before receiving a second portion (e.g., second portion 232 depicted in FIG. 2) of the beacon 211 (503). In some examples, the second portion 232 of the beacon 211 may include one or more information elements (IEs) of the beacon 211 transmitted after the DTIM message 220. In some examples, the second portion 232 of the beacon 211 may further include FCS information 214 of the beacon 211.

In some examples, operating the client device 303 in the low power mode of operation before receiving the second portion 232 of the beacon 211 comprises turning off one or more communications modules (e.g., COM module 352) of client device 303, before the second portion 232 of the beacon 211 is received. In other examples, operating the client device 303 in the low power mode of operation before receiving the second portion 232 of the beacon 211 comprises causing one or more data processing modules (e.g., DPM 350 depicted in FIG. 3) not to process the second portion 232 of the beacon 211.

The techniques described herein may be implemented in hardware, software, firmware, or any combination thereof. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

Various examples have been described. These and other examples are within the scope of the following claims.

The invention claimed is:

1. A method of operating a client device to communicate with a wireless network access point, comprising:
   receiving by the client device from the wireless network access point, a first portion of a beacon that includes a delivery traffic identification message (DTIM);
   determining, based on the DTIM, whether one or more packets of data are forthcoming from the wireless network access point; and
   operating the client device in a low power mode of operation before receiving a second portion of the beacon, wherein operating the client device in the low power mode of operation is based on whether the one or more packets of data are forthcoming from the wireless network access point and whether the client device is to synchronize with the wireless network access point using an internal clock reference of the client device and a timing synchronization function (TSF) of the second portion of the beacon.

2. The method of claim 1, wherein operating the client device in the low power mode of operation before receiving the second portion of the beacon comprises turning off a communications module of the client device such that the client device avoids receiving the second portion of the beacon.

3. The method of claim 1, wherein receiving the first portion of the beacon comprises processing the first portion of the beacon, and wherein operating the client device in the low power mode of operation before receiving the second portion of the beacon comprises avoiding processing the second portion of the beacon.

4. The method of claim 1, wherein operating the client device in the low power mode of operation before receiving the second portion of the beacon further comprises operating the client device in the low power mode of operation without performing a frame redundancy check (FCS) on the beacon.

5. The method of claim 1, wherein receiving the first portion of the beacon comprises processing a header portion of the beacon and at least one information element of a plurality of information elements of the beacon.

6. The method of claim 5, wherein operating the client device in the low power mode of operation before receiving the second portion of the beacon comprises avoiding receiving or processing at least one second information element of the plurality of information elements of the beacon.

7. The method of claim 1, further comprising:
   bypassing synchronization of the client device with the wireless network access point if the DTIM indicates that packets of data are not forthcoming from the wireless network access point.

8. The method of claim 7, wherein the TSF of the beacon comprises a counter value; the method further comprising:
   determining, based at least in part on the counter value, whether the client device is to use the beacon to synchronize with the wireless network access point.

9. The method of claim 7, wherein the beacon comprises a first beacon, and the method further comprises:
   receiving at least a portion of a second beacon that includes a corresponding DTIM and a corresponding timing synchronization function (TSF); and
   using the TSF of the second beacon to synchronize the client device with the wireless network access point when the corresponding DTIM of the second beacon indicates that no packets are forthcoming from the wireless network access point.

10. The method of claim 8, wherein the beacon is a first beacon, and the method further comprises:
   receiving a plurality of additional beacons after receiving the first beacon; and
   using a TSF of a subset of the plurality of additional beacons to synchronize the client device for further communications with the wireless network access point.

11. The method of claim 1, further comprising:
   comparing a value of the TSF of the beacon to at least one threshold; and
   determining whether the client device is to use the TSF of the beacon to synchronize the client device for further communications with the wireless network access point based on the comparison.

12. The method of claim 11, wherein the at least one threshold indicates an expected value of the TSF.

13. The method of claim 1, further comprising:
   operating the client device in an active mode of operation to receive one or more packets of data when the DTIM s indicates that one or more packets of data are forthcoming from the wireless network access point.

14. The method of claim 1, wherein operating the client device in the low power mode of operation before receiving the second portion of the beacon comprises avoiding receiving the second portion of the beacon by the client device.

15. A client device configured to communicate with a wireless network access point, comprising:
   a communications module configured to receive a first portion of a beacon that includes a delivery traffic identification message (DTIM);
   a data processing module configured to:
      determine, based on the DTIM, whether one or more packets of data are forthcoming from the wireless network access point; and
   a power mode module configured to operate the client device in a low power mode of operation before receiving a second portion of the beacon, wherein operating the client device in the low power mode of operation is based on whether the one or more packets of data are forthcoming from the wireless network access point and whether the client device is to synchronize with the wireless network access point using an internal clock reference of the client device and a timing synchronization function (TSF) of the second portion of the beacon.

16. The client device of claim 15, wherein the low power mode of operation comprises turning off the communications module of the client device such that the client device avoids receiving the second portion of the beacon.

17. The client device of claim 15, wherein the communications module receives the first portion of the beacon by processing the first portion of the beacon, and wherein the power mode module operates the client device in the low power mode of operation before the second portion of the beacon is received by the client device by avoiding processing the second portion of the beacon.

18. The client device of claim 15, wherein the power mode module operates the client device in the low power mode of operation without performing a frame redundancy check (FCS) on the beacon.

19. The client device of claim 15, wherein the communications module receives the first portion of the beacon by processing a header portion of the beacon and at least one information element of a plurality of information elements of the beacon.

20. The client device of claim 15, further comprising:
   a TSF module configured to:
      bypass synchronization of the client device with the wireless network access point if the DTIM indicates that packets of data are not forthcoming from the wireless network access point.

21. The client device of claim 20, wherein the TSF of the beacon comprises a counter value used to synchronize the client device with the wireless network access point.

22. The client device of claim 20, wherein the beacon comprises a first beacon, and wherein the communications module is further configured to:
   receive at least a portion of a second beacon that includes a corresponding DTIM and a corresponding TSF; and
   wherein the power mode module is configured to:
   use the TSF of the second beacon to synchronize the client device with the wireless network access point when the corresponding DTIM of the second beacon indicates that no packets are forthcoming from the wireless network access point.

23. The client device of claim 20, wherein the beacon is a first beacon, and wherein the TSF module is further configured to:
   receive a plurality of additional beacons after receiving the first beacon; and
   use a TSF of a subset of the plurality of additional beacons to synchronize the client device for further communications with the wireless network access point.

24. The client device of claim 15 further comprising a TSF module configured to:
   compare a value of the TSF of the beacon to at least one threshold; and
   determine whether the client device is to use the TSF of the beacon to synchronize the client device with the wireless network access point based on the comparison.

25. The client device of claim 24, wherein the at least one threshold indicates an expected value of the TSF.

26. The client device of claim 15, wherein the power mode module is further configured to:
   operate the client device in an active mode of operation to receive the one or more packets of data when the DTIM indicates that one or more packets of data are forthcoming from the wireless network access point.

27. The client device of claim 15, wherein the power mode module is configured to cause the client device to avoid receiving the second portion of the beacon.

28. A client device configured to communicate with a wireless network access point, comprising:
   means for receiving a first portion of a beacon that includes a delivery traffic identification message (DTIM);
   means for determining, based on the DTIM, whether one or more packets of data are forthcoming from the wireless network access point; and
   means for operating the client device in a low power mode of operation before receiving a second portion of the beacon, wherein operating the client device in the low power mode of operation is based on whether the one or more packets of data are forthcoming from the wireless network access point and whether the client device is synchronize with the wireless network access point using an internal clock reference of the client device and a timing synchronization function (TSF) of the second portion of the beacon.

29. The client device of claim 28, wherein the means for operating the client device in the low power mode of operation before receiving the second portion of the beacon further comprise means for turning off a communications module of the client device such that the client device avoids receiving the second portion of the beacon.

30. The client device of claim 28, wherein the means for receiving the first portion of the beacon comprise means for processing the first portion of the beacon, and wherein the means for operating the client device in the low power mode of operation before receiving the second portion of the beacon comprises means for avoiding processing the second portion of the beacon.

31. The client device of claim 28, wherein the means for operating the client device in the low power mode of operation before receiving the second portion of the beacon further comprises means for operating the client device in the low power mode of operation without performing a frame redundancy check (FCS) on the beacon.

32. The client device of claim 28, wherein the means for receiving the first portion of the beacon comprises means for processing a header portion of the beacon and at least one information element of a plurality of information elements of the beacon.

33. The client device of claim 32, wherein the means for operating the client device in the low power mode of operation before receiving the second portion of the beacon comprises means for avoiding receiving or processing at least one second information element of the plurality of information elements of the beacon.

34. The client device of claim 28, further comprising:
means for bypassing synchronization of the client device with the wireless network access point if the DTIM indicates that packets of data are not forthcoming from the wireless network access point.

35. The client device of claim 34, wherein the TSF of the beacon comprises a counter value; the device further comprising:
means for determining, based at least in part on the counter value, whether the client device is to use the beacon to synchronize with the wireless network access point.

36. The client device of claim 34, wherein the beacon comprises a first beacon, and the device further comprises:
means for receiving at least a portion of a second beacon that includes a corresponding DTIM and a corresponding TSF; and
means for using the TSF of the second beacon to synchronize the client device with the wireless network access point when the corresponding DTIM of the second beacon indicates that no packets are forthcoming from the wireless network access point.

37. The client device of claim 36, further comprising:
means for receiving a plurality of additional beacons after receiving the first beacon; and
means for using a TSF of a subset of the plurality of additional beacons to synchronize the client device for further communications with the wireless network access point.

38. The client device of claim 28 further comprising:
means for comparing a value of the TSF of the beacon to at least one threshold; and
means for determining whether the client device is to use the TSF of the beacon to synchronize the client device with the wireless network access point based on the comparison.

39. The client device of claim 38, wherein the at least one threshold indicates an expected value of the TSF.

40. The client device of claim 28, further comprising:
means for operating the client device in an active mode of operation to receive the one or more packets of data when the DTIM indicates that one or more packets of data are forthcoming from the wireless network access point.

41. The client device of claim 28, further comprising:
means for operating the client device in the low power mode of operation before receiving the second portion of the beacon by avoiding receiving the second portion of the beacon by the client device.

42. A non-transitory computer-readable storage medium that stores instructions configured to cause a computing device to:
receive, by a client device from a wireless network access point, a first portion of a beacon that includes a delivery traffic identification message (DTIM);
determine, based on the DTIM, whether one or more packets of data are forthcoming from the wireless network access point; and
operate the client device in a low power mode of operation before receiving a second portion of the beacon, wherein operating the client device in the low power mode of operation is based on whether the one or more packets of data are forthcoming from the wireless network access point and whether the client device is to synchronize with the wireless network access point using an internal clock reference of the client device and a timing synchronization function (TSF) of the second portion of the beacon.

43. The non-transitory computer-readable storage medium of claim 42, wherein the instructions configured to cause the computing device to operate the client device in the low power mode of operation before receiving the second portion of the beacon are further configured to cause the computing device to turn off a communications module of the client device such that the client device avoids receiving the second portion of the beacon.

44. The non-transitory computer-readable storage medium of claim 42, wherein the instructions configured to cause the computing device to receive the first portion of the beacon further cause the computing device to process the first portion of the beacon, and
wherein the instructions configured to cause the computing device to operate the client device in the low power mode of operation before receiving the second portion of the beacon further cause the computing device to avoid processing the second portion of the beacon.

45. The non-transitory computer-readable storage medium of claim 42, wherein the instructions configured to cause the computing device to
operate the client device in the low power mode of operation before receiving the second portion of the beacon further cause the computing device to operate the client device in a power saving mode of operation without performing a frame redundancy check (FCS) on the beacon.

46. The non-transitory computer-readable storage medium of claim 42, wherein the first portion of the beacon comprises a header portion of the beacon and at least one information element of a plurality of information elements of the beacon.

47. The non-transitory computer-readable storage medium of claim 46, wherein the instructions configured to cause the computing device to operate the client device in the low power mode of operation before receiving the second portion of the beacon further cause the computing device to avoid receiving or processing at least one second information element of the plurality of information elements of the beacon.

48. The non-transitory computer-readable storage medium of claim 42, wherein the instructions further cause the computing device to:
  bypass synchronization of the client device with the wireless network access point if the DTIM indicates that packets of data are not forthcoming from the wireless network access point.

49. The non-transitory computer-readable storage medium of claim 48 wherein the TSF of the beacon comprises a counter value; wherein the instructions further cause the computing device to:
  determine, based at least in part on the counter value, whether the client device is to use the beacon to synchronize the client device with the wireless network access point.

50. The non-transitory computer-readable storage medium of claim 48, wherein the beacon comprises a first beacon, and wherein the instructions further cause the computing device to:
  receive at least a portion of a second beacon that includes a corresponding DTIM and a corresponding TSF; and
  use the TSF of the second beacon to synchronize the client device for further communications with the wireless network access point when the corresponding DTIM of the second beacon indicates that no packets are forthcoming from the wireless network access point.

51. The non-transitory computer-readable storage medium of claim 50, wherein the instructions further cause the computing device to:
  receive a plurality of additional beacons after receiving the first beacon; and
  use a TSF of a subset of the plurality of additional beacons to synchronize the client device for further communications with the wireless network access point.

52. The non-transitory computer-readable storage medium of claim 42 wherein the instructions further cause the computing device to:
  compare a value of the TSF of the beacon to at least one threshold; and
  determine whether the client device is to use the TSF of the beacon to synchronize the client device with the access point based on the comparison.

53. The non-transitory computer-readable storage medium of claim 52, wherein the at least one threshold indicates an expected value of the TSF.

54. The non-transitory computer-readable storage medium of claim 42, wherein the instructions further cause the computing device to:
  operate the client device in an active mode of operation to receive the one or more packets of data when the DTIM indicates that one or more packets of data are forthcoming from the wireless network access point.

55. The non-transitory computer-readable storage medium of claim 42, wherein the instructions configured to cause the computing device to operate the client device in the low power mode of operation before receiving the second portion of the beacon further cause the computing device to avoid the second portion of the beacon.

* * * * *